Sept. 20, 1960

A. JACOBS 2,953,106

DIE EXTRUDING APPARATUS

Filed June 28, 1956

INVENTOR.
Arthur Jacobs
BY
Morton C. Jacobs
ATTORNEY.

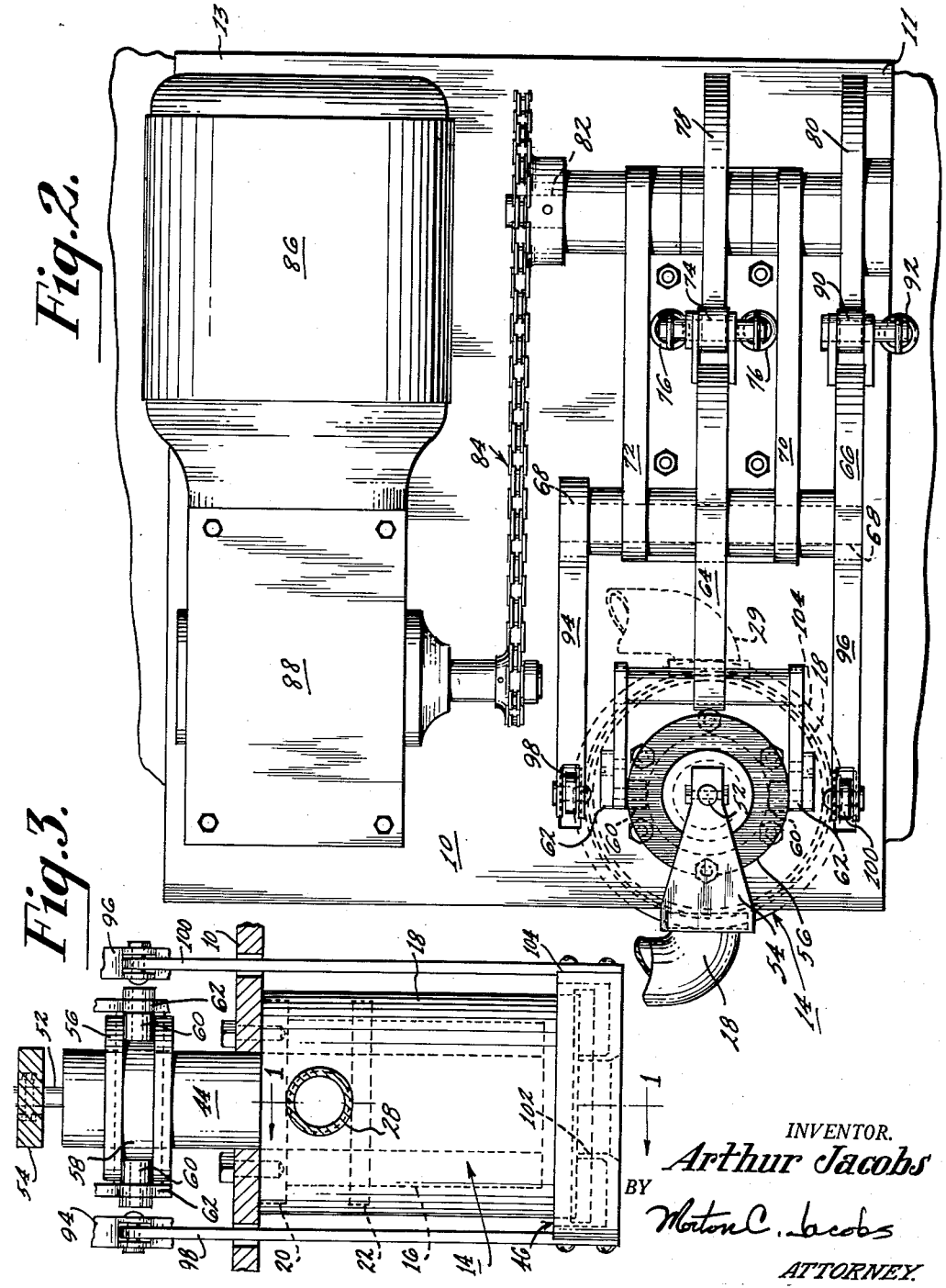

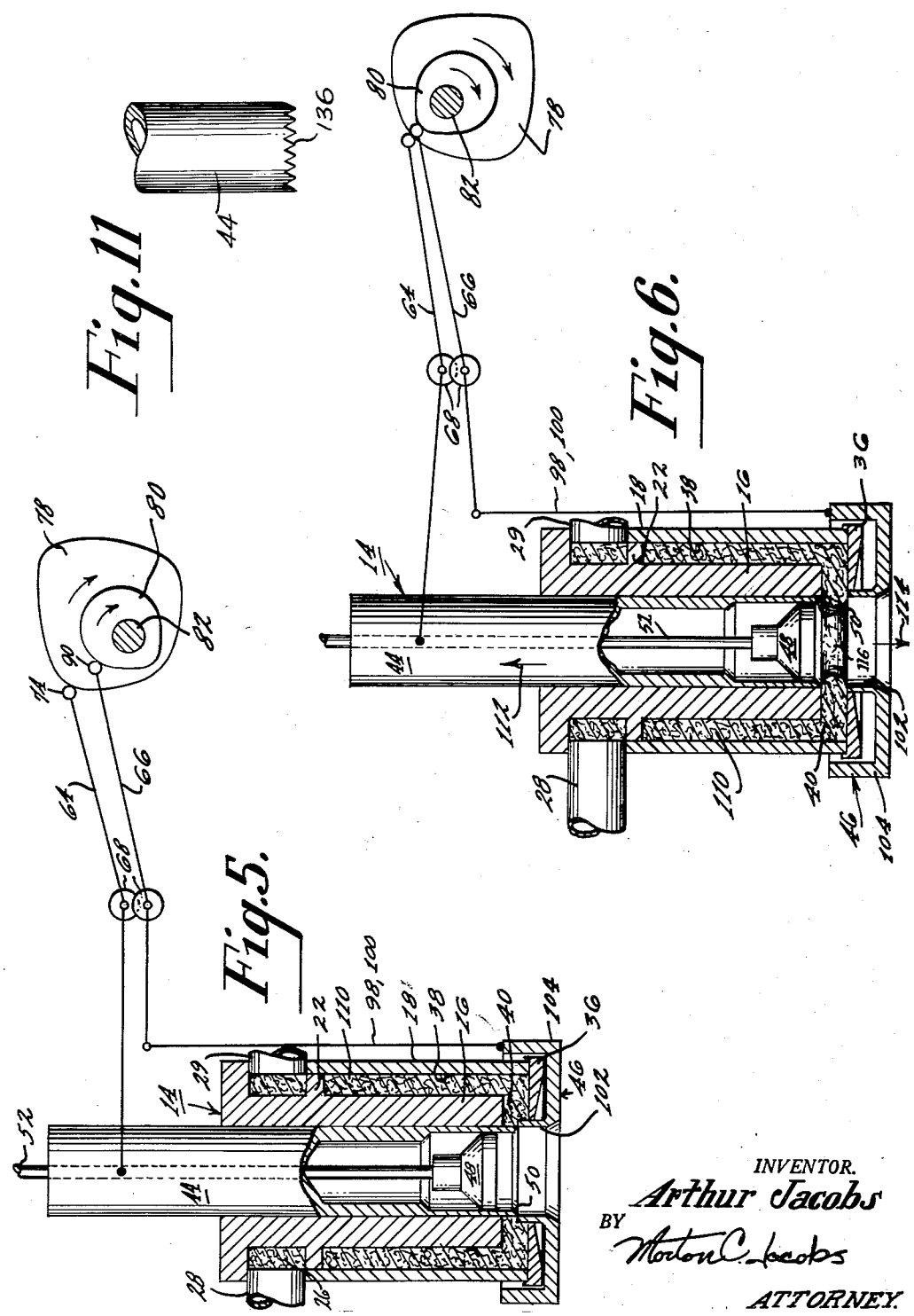

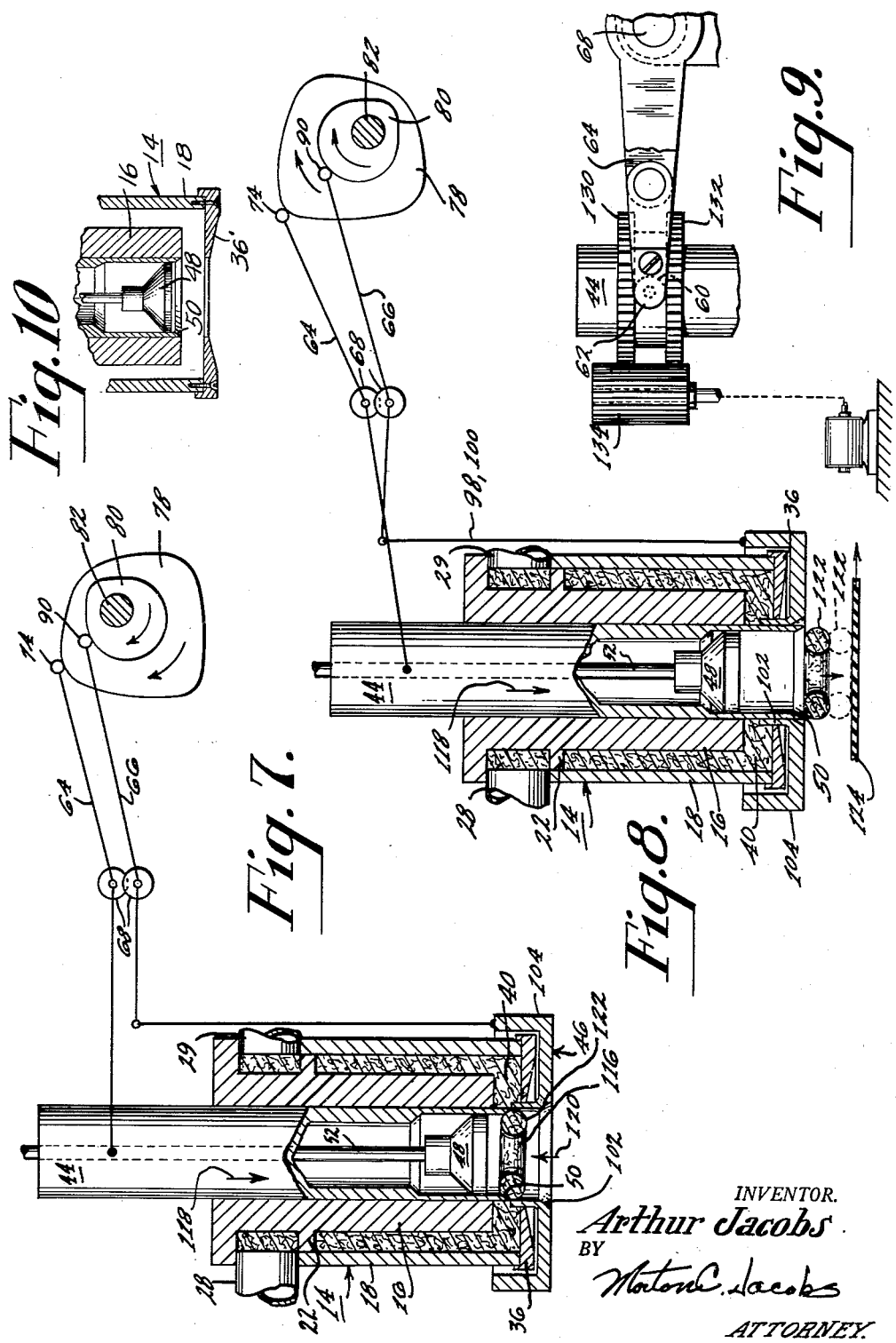

United States Patent Office 2,953,106
Patented Sept. 20, 1960

2,953,106

DIE EXTRUDING APPARATUS

Arthur Jacobs, 8 Croyden Road, Mineola, N.Y., assignor of one-half to Herbert E. Haug, Manhasset, N.Y.

Filed June 28, 1956, Ser. No. 594,635

12 Claims. (Cl. 107—14)

This invention relates to a system and apparatus for die extrusion, and more particularly to apparatus for extruding certain shapes such as ring or doughnut shapes.

In the extrusion of ring shapes, as in cutting doughnut pastries, it is customary to express the plastic dough material outwardly through a die opening in a circular supply container. In such apparatus, a closure for the die opening is operated periodically to permit dough to flow out of the container and, then, to close the die opening and cut off the extruded mass of dough to form a ring shape. Such apparatus for doughnut extrusion causes an expansion of the plastic material as it leaves the die opening. While this expansion of the material may be suitable for certain consistencies of dough and the like, it has been found, that with certain materials, such as relatively inelastic confectionery materials, this expansion tends to be excessive and fissures tend to be produced in the extruded material. It has also been found that the ring shapes extruded in this manner are not uniformly rounded.

Accordingly, it is among the objects of this invention to provide:

A new and improved system for shaping plastic material by die extrusion;

A new and improved apparatus for die extruding plastic material in the form of a ring or doughnut;

A new and improved apparatus for die extruding plastic material in the form of a ring that is generally uniformly rounded.

In accordance with this invention, apparatus for die extruding plastic material includes a passage for such material, which passage has a die opening formed around an inside wall. The plastic material is expressed through this opening to flow inwardly; the material tends to be compressed as it is extruded. A closure for the die opening is operated to close the opening and to cut the extruded material in the desired shape.

Also in accordance with this invention, a closure for a die opening of a ring-shape die extruder includes two valves that meet in a closed position at an intermediate part of the die opening. The valves are moved away from each other in opposite directions to open the die opening and towards each other to close the die opening and to cut the extruded material. By appropriate timing of these valve movements, the extruded material may be shaped as desired.

The foregoing and other objects, the advantages and novel features of this invention, as well as the invention itself both as to its organization and mode of operation, may be best understood from the following description when read in connection with the accompanying drawing, in which like reference numerals refer to like parts, and in which:

Figure 2 is a top view of the apparatus shown in Figure 1;

Figure 3 is a front view of the apparatus shown in Figure 1 taken partly in section along the line 3—3 of Figure 1;

Figure 5 is a schematic and sectional view of an idealized form of the apparatus shown in Figure 1 assuming an operating condition in which the die-opening valves are in the closed position;

Figure 6 is a schematic view similar to Figure 5, in which the die-opening valves are in the open position;

Figure 7 is a schematic view similar to Figure 5, in which the die-opening valves are returned to the closed position;

Figure 8 is a schematic view similar to Figure 5, in which the upper die-opening valve is in a lowered ejection position;

Figure 9 is a side view of a portion of a modification of the apparatus embodying this invention;

Figure 10 is fragmentary side view in section of a modification of this invention; and Figure 11 is a fragmentary view of an extruder valve embodying this invention.

Figures 1, 4:
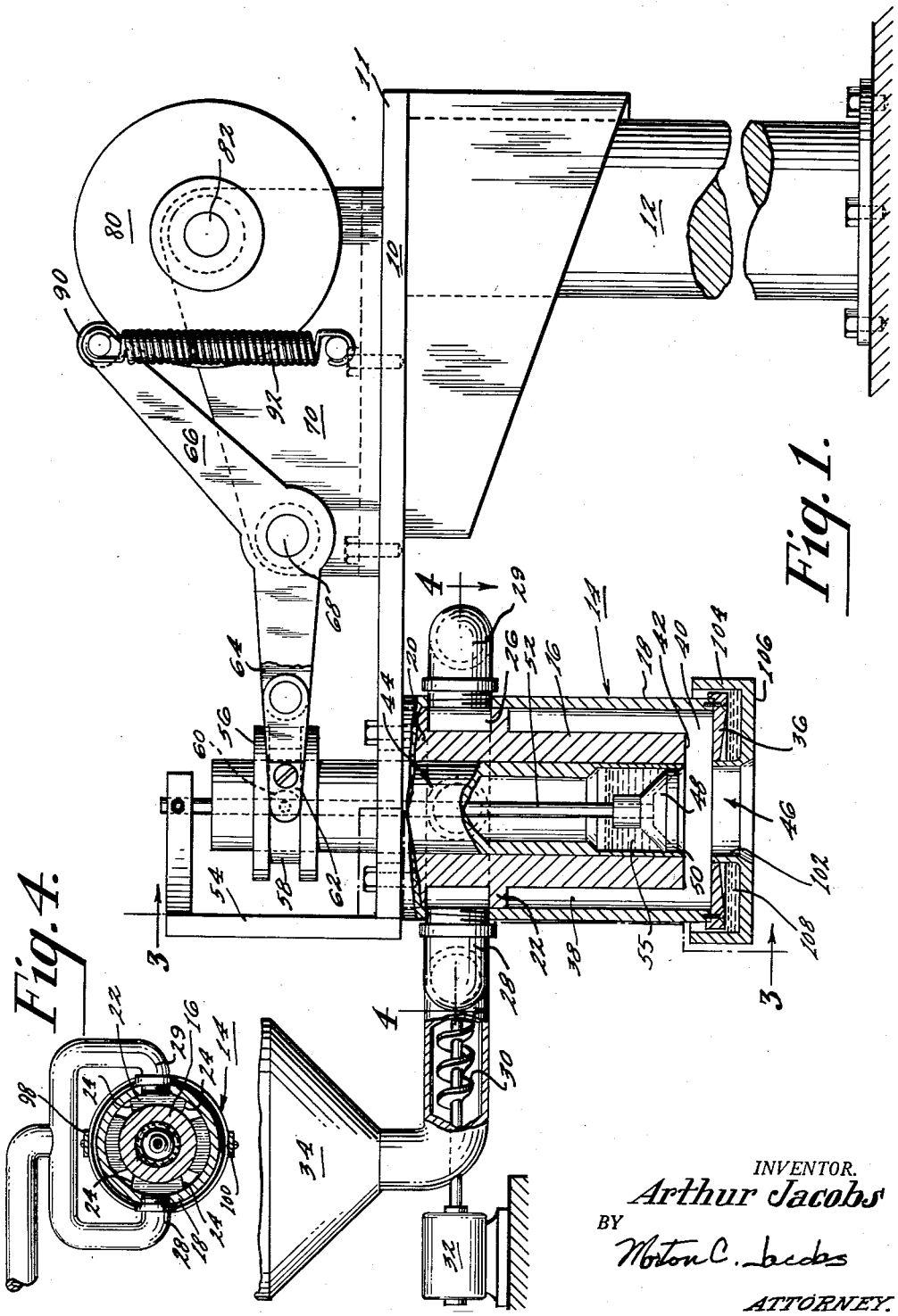
Figure 1 is a side view of a die extrusion apparatus embodying this invention taken partly in section along the line 1—1 of Figure 3.
Figure 4 is a sectional view along the line 4—4 of Figure 1.

In Figure 1, a die extruder machine embodying this invention is shown mounted for use as viewed from the side. A flat rectangular frame member 10 is supported horizontally at its corners 11 and 13 on the right side by two standards 12 (only one of which may be seen in Figure 1). Attached to the frame member 10 to be suspended therefrom is the die extruder portion 14 of the machine.

This die extruder 14 includes a cylindrical inside tube 16 enclosed concentrically within a cylindrical outside tube 18. The inside tube 16 has an upper flange portion 20 extending around its outer surface, to which is fastened the outside tube 18. The inside tube 16 may be bolted to the frame member 10 at this upper flange portion 20, as shown in the drawing. A second flange portion 22 on the inside tube 16 extends completely around the outer surface of the tube 16, and has four apertures 24 cut therethrough as may be seen in Figure 4. An annular chamber 26 is formed between the two tubes 16 and 18 and the two flanges 20 and 22.

Two input pipes 28, 29 are threaded into the outside tube 18 at diametrically opposite positions and open into the annular chamber 26. These pipes 28, 29 are connected together externally in a Y-connection to be supplied by a screw feed 30. The screw feed 30 may be driven by a motor 32 to supply the input pipes 28, 29 with plastic material from a supply hopper 34. Other suitable arrangements for supplying plastic material continuously under pressure to the pipes 28, 29 may be used.

An annular plate 36 is fastened to the lower end of the outer tube 18. An annular passage 38 is formed between this plate 36 and the flange 22 and between the tubes 16 and 18. This bottom plate 36 also forms a passage 40 with the bottom annular surface 42 of the inner tube 16. This passage 40 is at right angles to the annular passage 38 formed between the inner and outer tubes 16 and 18, and opens at the inside surfaces of the inner tube 16 and the plate 36. Thus, the tubes 16 and 18 and the plate 36 form a unitary conduit structure for carrying plastic material. This conduit has two annular passages, the passage 38 oriented vertically and the passage 40 oriented generally horizontally. The passage 40 of this conduit opens at the inside wall of the conduit structure, which wall includes the inside surfaces of the inner tube 16 and the plate 36. The passage 40 may be arranged to be at an angle other than a right angle to the inside surface of the tube 16 depending on the plastic material used and the shape to be extruded.

Two valves 44 and 46 are provided to close the opening of the annular passage 40. The upper valve 44 is a cylindrical tube that slides closely within the inner tube 16 and upwardly through an opening in the frame member 10. A conical stopper and guide 48, held within the lower portion 50 of the upper valve 44, is fixed to a rod 52. This rod 52 is supported at its upper end by means of a bracket 54 attached to the frame member 10. The lower portion 50 of the upper valve 44 is recessed, and its bottom edge is beveled to provide a cutting edge as it moves down from the open position shown in Figure 1. A lubricant 55 may be stored within the recessed portion 50 of the upper valve 44 above the stopper 48. Such a lubricant would lubricate the cutting edge of the valve 44 and prevent adherence of the plastic material.

A collar 56 is fixed to the upper portion of the upper valve 44 above the frame member 10. This collar has an annular groove 58 formed therearound, in which ride roller bearings 60 that are rotatably mounted on opposite forked ends 62 of a crank arm lever 64 (Figures 1, 2, and 3). The crank arm 64 is generally the same size and shape as a second crank arm 66. As viewed from the side in Figure 1, the left end of the arm 66 is cut away, and a portion of the arm 64 may be seen. The crank arm 64 pivots around a shaft 68 that is fixed at one end to the crank arm 66, and is rotatably mounted in spaced support brackets 70, 72 (Figure 2) bolted to the frame member 10. A cam-follower roller 74 is rotatably attached to the other end of the crank arm 64. A pair of springs 76, 76 connected to either side of the crank arm 64 and to the frame member 10 tends to hold the cam follower 74 in engagement with a cam 78. (This cam 78 and a second cam 80 are shown as circular in profile for simplicity of illustration; appropriate profiles for these cams 78, 80 will be apparent from a description below of Figures 5 to 8). These cams 78, 80 are keyed to a shaft 82, which is supported by the spaced shaft support brackets 70, 72. At one end this rotatable shaft 82 is driven through a chain drive 84 from a motor 86 and a gear unit 88.

The second crank arm 66 has a cam-follower roller 90 rotatably mounted at one end. A spring 92 holds this cam follower in engagement with the second cam 80. This crank arm 66 has fixed to it one end of the rotatable shaft 68. Fixed to the opposite end of this rotatable shaft 68 is a second arm 94 that forms a fork with the left hand end 96 of the crank arm 66. Separate links 98 and 100 are pivotally attached to and suspended from the outer end of these fork arms 94 and 96, respectively, and pass through openings in the frame member 10.

The lower valve 46 is fixed to these links as shown in Figure 3. This lower valve 46 is formed somewhat like an annular dish shape. This valve 46 has an inside tubular portion 102 and an outside tubular portion 104. The inside tubular portion 102 is slidable in the annular plate 36 to move up and partly close the horizontal annular passage 40. The outside tubular portion 104 of the lower valve 46 is attached at opposite points to the links 98 and 100. This outside portion 104, the inside tubular portion 102 and an annular flat connecting portion 106 form a container for a lubricant 108 to prevent adherence of the plastic material to the valve portion 104. The wall thickness of the valve portion 104 and the radius of the inside opening of the annular plate 36 are such that the inside cylindrical surface of the valve portion 102 is generally in alignment with the concentric cylindrical surface of the tube 16. Therefore, the valve portions 50 and 102 are properly dimensioned for the valve portion 50 to move within the valve portion 102.

The operation of the extruder machine is described with reference to Figures 5 to 8. These four figures show the positions assumed by the moving parts of the machine over a complete cycle of operation. For simplicity of illustration, some of the parts such as the crank arms 64 and 66 and associated linkages and the cams 78 and 80 are shown schematically.

Figure 5 illustrates the normal position of the moving parts with the valve portions 50 and 102 meeting at approximately the center plane of the annular passage 40 to close the inside die opening of that passage completely. The left portions of the crank arms 64 and 66 are shown as assuming a horizontal position in Figure 5, whereby this normal position of these crank arms 64 and 66 may be readily noted and distinguished from the other positions shown in Figures 6 and 8.

As shown in Figure 5, the plastic material 110 fills the passages 40 and 38 and the chamber 26; this condition exists when the valve portions 50 and 102 close the passage 40 as well as when the passage 40 is open. The screw feed 30 (Figure 1) continuously supplies the plastic material 110 through the input pipes 28 and 29 to the annular chamber 26 formed above the baffle flange plate 22. The apertures 24 in the baffle plate 22 are displaced approximately 45° from the adjacent input pipes 28 and 29 (Figure 4). Consequently, these apertures 24 serve as inputs to the annular passage 38, and supply the plastic material 110 to this passage 38 with a substantially uniform pressure distribution around that passage. Likewise, the material 110 in the horizontal passage 40 has a substantially uniform pressure distribution for any radial position.

As shown in Figure 6, quarter-cycle rotations of the cams 78 and 80 from the positions shown in Figure 5 result in the crank arm 64 moving the valve 44 upwards as shown by the arrowhead 112 and, also, results in the crank arm 66 moving the valve 46 downwards as shown by the arrowhead 114. In the position shown in Figure 6, the valves 44 and 46 have been moved to their fully opened position. The plastic material 110, under pressure, moves in a radially inward direction through the annular die opening formed by the passage 40 and the edges of the valve portions 50 and 102.

This material 110 starts to move out of the passage 40 as soon as the valve portions 50 and 102 start to separate. The full separation or opening of these valve portions 50 and 102 takes place over the quarter-cycle of rotation of the cams 78 and 80 from the positions shown in Figure 5 to those shown in Figure 6. As a result, the material 110 extruded through the passage 40 and the opening formed by the cutting edges of the valve portions 50 and 102 tends to bulge inwardly forming an inside surface 116 of generally circular cross-section. The quarter-cycle of operation from the positions of Figure 5 to those of Figure 6 results in the formation of half the surface of the extruded doughnut or ring shape.

In the next quarter-cycle of operation between the positions shown in Figure 6 to those shown in Figure 7, the cams 78 and 80 cause the levers 64 and 66 to move the valves 44 and 46 in the direction of the arrowheads 118 and 120, respectively. As the cutting edges of the valve portions 50 and 102 move together, these edges form the remaining portion, the outside surface, of the doughnut 122. As shown in Figure 7, at the completion of the third quarter-cycle, the cutting edges of the valve portions 50 and 102 meet again at the central plane of the passage 40, and the shaping process forming the doughnut 122 is completed.

In the next quarter-cycle as the parts move from the positions shown in Figure 7 to those shown in Figure 8, the valve 44 continues to move downward, as shown by the arrowhead 118. The valve 46 remains stationary, in the quarter-cycle between the position of the cam 80 shown in Figure 7 and that shown in Figure 8; the profile of the cam 80 is such as to provide an idle condition in this quarter-cycle. Accordingly, the valve portion 50 moves down within the stationary portion 102. The valve portion 50 pushes the completed doughnut 122 out of the valve 46 to insure ejection of the doughnut 122 when it is formed. A conveyor 124 may be positioned beneath the valve 46 to receive the doughnut 122 as it drops. This conveyor 124 may serve to transport the completed doughnuts to processing apparatus (not shown).

In the next quarter-cycle of the cams 78 and 80 as they move from the positions shown in Figure 8 to those shown in Figure 5, the valve 44 is moved upwards and returned to the position shown in Figure 5. The valve 46 continues to remain stationary as the cam 80 continues to move through an idle portion of the profile. Thus, upon the completion of the fourth quarter-cycle of operation the moving parts are returned to the positions shown in Figure 5, from which positions the next cycle may start to form another doughnut. With the arrangement of the cam shaft 82 being continuously driven through the chain drive 84 and gear unit 88, each cycle is followed immediately by a succeeding cycle, so that the doughnuts are continuously being formed and ejected. If a periodic operation is desired a one-revolution clutch (not shown) may be included within the gear unit 88 to be operated by an appropriate mechanical or electrical actuating signal when desired.

By means of the arrangement of the two valve portions 50 and 102, the cross-sectional shape of the extruded ring 122 may be made to be substantially circular. The separation of the valve portions 50 and 102 in opposite directions at the same speed insures a symmetrical shape to the extruded mass, with the plane of symmetry being the central plane of the passage 40 where the valve portions 50 and 102 meet. With harmonic motion in the reciprocation of the valve portions 50 and 102, a substantially circular cross-section of the extruded ring is produced; the above described reciprocation is harmonic motion. The cutting edges of the valve portions 50 and 102 form the orifice of the die opening when reciprocated in this manner.

Other than circular cross-sections may be produced, for example, by variations in the speeds of reciprocation of the valve portions 50 and 102 at different portions of the cycle. The normal plane at which the valve portions 50 and 102 meet in the closed position may be at other intermediate planes than the central plane. This feature of two movable valves or die opening closures for controlling the cross-sectional shapes of extruded ring shapes is not limited in its application to inward extrusion; it may also be used for the same purpose in extruding ring shapes in an outward direction.

An asymetrical cross-section (i.e. a generally semicircular cross-section) may be produced, for example, by using but a single valve closure, such as the valve 44 operating alone, which would move across the entire passage 40 to open and close it completely, with the valve 46 held stationary in the open position shown in Figure 6. For such single-valve operation, the apparatus shown in Figure 1 may be modified by replacing the valve 46 and the annular plate 36 by a similar annular plate 36′ (shown in Figure 10) that is slightly larger by the thickness of the valve portion 102 and that is, thereby, in radial alignment with the inside surface of the inner tube 16. The shape of the extruded material may also be controlled by an intermittent application of pressure to the material in the passages 38 and 40. For example, an extruded shape of rectangular cross-section may be produced by the application of pressure to the material in the passages 38 and 40 only when the valve portions 50 and 102 are held stationary in the fully open position of Figure 6. In other positions, valve means (not shown) blocks the application of pressure to the plastic material in these passages 38 and 40.

With the arrangement of the collar 56, and the rollers 60 rotating in the groove 58 (Figure 3) the valve 44 is adapted for rotation about its central axis. Such rotation may be produced by means of gear wheels 130, 132 attached to the upper portion of the valve 44 to form a collar similar to the collar 56 shown in Figure 1. These gears 130, 132 may be driven by any suitable motor means through the pinion 134, which is in sliding engagement with the gears 130, 132 through the entire travel of the valve 44. Such rotating drive of the valve 44 may be continuous, or it may be made to be intermittent in appropriate time relation with the operation of the cams 78 nad 80. By means of this rotation and by means of an irregular or specially shaped cutting edge 136 (Figure 11) to the valve portion 50, fluted spiral and similar designs may be formed in the surface of the extruded doughnut as the valve 44 moves up or down or both. This feature of a rotatable valve or die opening closure for forming designs in the extruded rings is not limited in its application to inward extrusion; it may also be used for the same purpose in extruding ring shapes in an outward direction.

This apparatus is adapted for use in extruding and shaping various kinds of plastic material. For example, dough material may be used for forming doughnut pastries, confectionery material may be used for forming ring-shaped candies, and other materials may be used for forming various ring-shaped articles.

Thus, in accordance with this invention a new and improved system is provided for shaping plastic material by die extrusion. Plastic material may be extruded in the form of a ring or doughnut, and the cross sectional shape of the ring may be uniformly rounded as desired.

What is claimed is:

1. An apparatus for extruding doughnuts from a supply of plastic dough material, said apparatus comprising a frame member adapted to be positioned horizontally, an inner tube adapted to be attached at its upper portion to said frame member so as to have its axis oriented substantially vertically, an outer tube attached concentrically to said inner tube, the inside surface of said outer tube being spaced from the outside surface of said inner tube to form an annular space, baffle means separating said annular space into an upper chamber and a lower passage, means for supplying said plastic dough material to said chamber under pressure, an annular plate attached substantially horizontally to the lower edge of said outer tube and forming a substantially horizontal die opening passage with the lower edge of said inner tube, two tubular valves mounted for vertical movement respectively within said inner tube and said annular plate, and means for intermittently reciprocating said valves in opposite directions with respect to each other to move away from and open said die opening passage and to move together across and close said die opening passage.

2. Apparatus for extruding ring shapes comprising a conduit for plastic material having a plurality of walls including a bottom wall, a tubular inner wall, and a tubular outer wall spaced from said inner wall to form a passageway for said material, said inner wall and said bottom wall having spaced surfaces substantially perpendicular to the axis of said inner wall to form an extrusion passage, and having circular edges that are coaxial and spaced to form an annular die opening therebetween in communication with said passageway via said extrusion passage to receive said material for extrusion thereof in a ring shape radially inward without expansion of the diameter thereof, means for supporting said conduit with the axis of said inner wall vertical, means for supplying material under pressure to said conduit, a tubular closure for said die opening mounted for vertical movement coaxially with said inner wall and across said opening, said tubular inner wall having means therein for preventing passage of material therethrough, means for reciprocating said closure to open and close said die opening and means for timing said reciprocating means to have that certain time relationship of opening and closing said die opening effective to form said material in a ring shape by passage through said die opening.

3. Apparatus for extruding ring shapes, comprising a conduit for plastic material having a plurality of walls including a tubular inner wall and an outer wall spaced from said inner wall to form a passageway for said material, said inner wall and another one of said conduit walls having circular edges that are coaxial and spaced to form an opening therebetween directly radially inward and in communication with said passageway to receive said material for passage therethrough, and means for controlling passage of said material through said opening including two annular valve members mounted coaxially with said wall edges and next to said opening, said valve members being mounted for axial movement apart and together to form an annular extrusion opening therebetween and arranged to receive said plastic material from said wall opening, and means for moving said valve members apart and together in a certain time relationship to form said material in a ring shape by passage through said extrusion opening.

4. Apparatus for extruding articles in ring shapes, said apparatus comprising a conduit for plastic material, said conduit having coaxial cylindrical walls with circular edges separated by a certain spacing to form an opening therebetween for passage of said plastic material, and means for controlling passage of said material through said opening including two annular valve members mounted coaxially with said wall edges and next to said opening, said valve members being mounted for axial movement apart and together to form an annular extrusion opening therebetween as they move apart and together, said annular extrusion opening being in direct communication with said wall opening to receive said plastic material, said valve members being together in contact to close said extrusion opening, and said container opening, said valve members being movable apart to the extent of said wall spacing to permit extrusion through said wall opening, and means for actuating said valve members to cause movement thereof in a certain time relationship to form ring shapes of generally round cross-section.

5. Apparatus for extruding articles in ring shapes, said apparatus comprising a conduit for plastic material, said conduit having a plurality of walls each with a circular edge, said wall edges being coaxially spaced to form an opening therebetween for passage of said plastic material, and means for controlling passage of said material through said opening including two annular valve members mounted coaxially with said wall edges and next to said opening, said valve members being mounted for axial movement apart and together to form an annular extrusion opening therebetween and in direct communication with said wall opening to receive said plastic material, said valve members being in contact when together to close said extrusion opening and said wall opening.

6. Apparatus for extruding articles in ring shapes, said apparatus comprising a conduit for plastic material, said conduit having a plurality of walls each with a circular edge, said wall edges being coaxially spaced to form an opening therebetween for passage of said plastic material, and means controlling passage of material through said opening, said controlling means including two annular valve members mounted coaxially with said wall edges and next to said opening, said valve members being mounted for axial movement apart and together to form an annular extrusion opening therebetween and in direct communication with said wall opening to receive said plastic material, said valve members being in contact when together to close said extrusion opening and said wall opening, and means for actuating said valve members to cause movement thereof in a certain time relationship to form ring shapes of substantially circular cross-section.

7. In combination, apparatus for extruding articles in ring shapes, said apparatus comprising a conduit for plastic material, said conduit having a plurality of walls each with a circular edge, said wall edges being coaxially spaced to form an opening therebetween for passage of said plastic material, and means for controlling passage of said material through said opening, said controlling means including two annular valve members mounted coaxially with said wall edges and next to said opening, said valve members being mounted for axial movement apart and together to form an annular extrusion opening therebetween and in direct communication with said wall opening to receive said plastic material, said valve members being in contact when together to close said extrusion opening and said wall opening, and means for actuating said valve members to cause movement thereof in a certain time relationship to form ring shaped articles of substantially circular cross-section, said actuating means including cyclically operative means for causing movement of said valve members in harmonic motion.

8. Apparatus for extruding articles, said apparatus comprising a conduit for plastic material, said conduit having a plurality of walls each with a circular edge, said wall edges being coaxially spaced to form an opening therebetween for passage of said plastic material, and means for controlling passage of said material through said opening including two annular valve members mounted coaxially with said wall edges and next to said opening, said valve members being mounted for axial movement apart and together to form an annular extrusion opening therebetween and in direct communication with said wall opening to receive said plastic material, said valve members being together to close said extrusion opening and said wall opening, one of said valve members being rotatable about the axis of said annular opening to form designs on the extruded material.

9. Apparatus for extruding ring shaped articles comprising a conduit with inner and outer walls to form an annular passageway, means for supplying plastic material to one end of said conduit passageway, and means for extruding ring shaped articles at the other end thereof, said extruding means including a plurality of movable annular valve members mounted in one position across said annular passageway to close said other end of said passageway, said valve members being movable apart and together to open and close said other passageway end, and means for actuating said valve members to move apart and together in a certain time relationship to extrude ring shaped articles.

10. Apparatus for extruding ring shaped articles comprising a conduit with inner and outer walls to form an annular passageway, means for supplying plastic material to one end of said conduit passageway, and means for extruding ring shaped articles at the other end without expansion of the diameter thereof, said extruding means including two movable annular valve members mounted in one position across said annular passageway to close said other end of said passageway, said valve members being movable apart and together to open and close said other passageway end, and means for actuating said valve members to move apart and together in a certain time relationship to extrude ring shaped articles, said other end of said passageway being arranged to direct said material radially inward, said valve members being cylindrical and one movable within the other to eject extruded ring shaped articles.

11. An apparatus for extruding doughnut shaped articles and forming designs on the surface of said article comprising a conduit for plastic dough material and having a tubular wall, and means for supplying said dough material to said conduit, said conduit including another wall that is circular and spaced from said tubular wall to form therebetween an annular extrusion opening, a movable member, said member being circular, coaxial with said annular opening, and movable across said extrusion opening to open and close said opening, said member also being rotatable about an axis through the centers of said member and said annular opening and having a design forming edge, and means for rotating said member, whereby said edge of said member rotatably contacts said article extruded through said opening as said member moves to open and close said opening.

12. Apparatus for extruding ring shaped articles from plastic material, said apparatus comprising a conduit for said material, said conduit having a plurality of circular walls spaced to form an annular die extrusion opening therebetween, and a valve having a circular portion movable next to one of said walls and across and away from said opening, said valve being annular and dish shaped to form a container in sliding contact with said one wall of said conduit to hold a lubricant for said circular valve portion.

References Cited in the file of this patent

UNITED STATES PATENTS

| | | |
|---|---|---|
| 651,829 | Copland | June 19, 1900 |
| 1,121,431 | Westerman | Dec. 15, 1914 |
| 1,484,961 | Peele | Feb. 26, 1924 |
| 1,696,099 | Moores | Dec. 18, 1928 |
| 1,866,061 | Schoel | July 5, 1932 |
| 1,909,449 | Belshaw | May 16, 1933 |
| 2,004,161 | Fausel | June 11, 1935 |
| 2,256,617 | Kipnis | Sept. 23, 1941 |
| 2,676,552 | Hunter et al. | Apr. 27, 1954 |